(12) United States Patent
Ma et al.

(10) Patent No.: US 9,470,844 B1
(45) Date of Patent: Oct. 18, 2016

(54) LOW LOSS HIGH EXTINCTION RATIO ON-CHIP POLARIZER

(71) Applicant: Coriant Advanced Technology, LLC, New York, NY (US)

(72) Inventors: Yangjin Ma, New York, NY (US); Ruizhi Shi, New York, NY (US); Yang Liu, Elmhurst, NY (US)

(73) Assignee: Coriant Advanced Technology, LLC, New York, NY (US)

( * ) Notice: Subject to any disclaimer, the term of this patent is extended or adjusted under 35 U.S.C. 154(b) by 0 days.

(21) Appl. No.: 14/788,608

(22) Filed: Jun. 30, 2015

(51) Int. Cl.
  *G02B 6/00* (2006.01)
  *G02B 6/126* (2006.01)
  *G02B 6/122* (2006.01)
  *G02B 6/125* (2006.01)

(52) U.S. Cl.
  CPC .............. *G02B 6/126* (2013.01); *G02B 6/125* (2013.01); *G02B 6/1228* (2013.01)

(58) Field of Classification Search
  CPC ..... G02B 6/126; G02B 6/1228; G02B 6/125
  USPC .......................................... 385/11; 29/592.1
  See application file for complete search history.

(56) References Cited

U.S. PATENT DOCUMENTS

| 7,200,308 | B2 | 4/2007 | Hochberg |
| 7,339,724 | B2 | 3/2008 | Hochberg |
| 7,424,192 | B2 | 9/2008 | Hochberg |
| 7,480,434 | B2 | 1/2009 | Hochberg |
| 7,643,714 | B2 | 1/2010 | Hochberg |
| 7,760,970 | B2 | 7/2010 | Baehr-Jones |
| 7,894,696 | B2 | 2/2011 | Baehr-Jones |
| 8,031,985 | B2 | 10/2011 | Hochberg |
| 8,067,724 | B2 | 11/2011 | Hochberg |
| 8,098,965 | B1 | 1/2012 | Baehr-Jones |
| 8,203,115 | B2 | 6/2012 | Hochberg |
| 8,237,102 | B1 | 8/2012 | Baehr-Jones |
| 8,258,476 | B1 | 9/2012 | Baehr-Jones |
| 8,270,778 | B2 | 9/2012 | Hochberg |
| 8,280,211 | B1 | 10/2012 | Baehr-Jones |
| 8,311,374 | B2 | 11/2012 | Hochberg |
| 8,340,486 | B1 | 12/2012 | Hochberg |
| 8,380,016 | B1 | 2/2013 | Hochberg |
| 8,390,922 | B1 | 3/2013 | Baehr-Jones |
| 8,798,406 | B1 | 8/2014 | Hochberg |
| 8,818,141 | B1 | 8/2014 | Hochberg |
| 2002/0076188 | A1* | 6/2002 | Kimerling ............... G02B 6/12 385/132 |
| 2005/0244119 | A1* | 11/2005 | Sasaki ............... C03B 19/1453 385/123 |
| 2010/0296775 | A1* | 11/2010 | Png ...................... B82Y 20/00 385/31 |
| 2015/0104128 | A1* | 4/2015 | Oka ................... G02B 6/2726 385/3 |

* cited by examiner

*Primary Examiner* — Jerry Blevins
(74) *Attorney, Agent, or Firm* — Nixon Peabody LLP

(57) ABSTRACT

A low loss high extinction ratio on-chip polarizer has at bi-layer optical taper with an input port of width W1 that communicates with a mode squeezer, followed by an S-bend (or dump bend), and finally a taper having an output port of width W1. The illumination that passes through the low loss high extinction ratio on-chip polarizer has a TM0 mode converted to a TE1 mode which is lost in the mode squeezer and S-bend section, while an input TE0 mode is delivered at the output as a substantially pure TE0 signal of nearly undiminished intensity.

13 Claims, 3 Drawing Sheets

LOW LOSS HIGH EXTINCTION RATIO ON-CHIP POLARIZER

FIELD OF THE INVENTION

The invention relates to optical waveguides in general and particularly to a waveguide that strips a TM fundamental mode while passing a TE fundamental mode.

BACKGROUND OF THE INVENTION

High-speed coherent transmission requires high standard coupling between fibers and photonic integrated chips (PICs). However most photonic integrated circuits operate at a specific polarization state, usually polarization of the fundamental mode. This is different from the situation in single mode fiber where radial symmetry guarantees the equivalence of different polarization orientations.

Inside a PIC, higher order modes will be excited as a consequence of imperfections such as side wall roughness, and as a consequence of reflections, transitions between multimode and single mode regions, and other interactions of the optical signal with the mechanical structure of the PIC.

Generally, integrated waveguides have two orthogonal transverse polarization states, TE and TM, each of which has a lowest ordered mode, TE0 and TM0, respectively. Between TE0 and TM0, the mode that has a lower mode number (i.e., the largest effective refractive index) is defined as the fundamental mode of the waveguide.

Higher order modes are generally easy to get rid of by tapering down the waveguide to a single mode region, as they become leaky modes. However, it is difficult to get rid of the TM0 mode because it is the lowest mode of the TM modes.

There are some typical and straightforward ways to eliminate a TM0 mode. One approach is to use a directional coupler to couple TM0 mode out of the waveguide. However this method is wavelength sensitive.

Another approach is to place metal at top of waveguide to absorb the TM0 mode. However, this approach is usually not compatible with standard CMOS processes and additionally introduces extra loss for the TE0 mode as well.

There is a need for systems and methods that maintain optical signals in well-defined polarization states.

SUMMARY OF THE INVENTION

According to one aspect, the invention features a low loss high extinction ratio on-chip polarizer, comprising: a bi-layer taper having an input port having a width W1 and a bi-layer taper output port having a width W2; a mode squeezer having an input port having a width W2 in optical communication with the bi-layer taper output port and a mode squeezer output port with a width W3, where W2 is larger than W3; an optical carrier having an input port in communication with the mode squeezer output port and having a transition region, the optical carrier configured to be lossy with regard to optical modes above the fundamental mode; and an output taper in optical communication with the transition region and having an output taper output port of width W1.

In one embodiment, the optical carrier is an S bend.

In another embodiment, at least one of the bi-layer taper, the mode squeezer, the optical carrier and the output taper is disposed on a semiconductor wafer.

In yet another embodiment, the semiconductor wafer is a silicon on insulator wafer.

In still another embodiment, the bi-layer taper is configured to convert a TM0 mode into a TE1 mode but preserve a TE0 mode.

In a further embodiment, the mode squeezer is configured to narrow down a waveguide to squeeze a TE1 mode out of the waveguide.

In yet a further embodiment, the optical carrier is configured as a narrow and leaky waveguide for higher modes and is configured to preserve a TE0 mode.

In an additional embodiment, the low loss high extinction ratio on-chip polarizer is configured to operate at a wavelength within the range of a selected one of an O-Band, an E-band, a C-band, an L-Band, an S-Band and a U-band.

According to another aspect, the invention relates to a method of making a low loss high extinction ratio on-chip polarizer. The method comprises the steps of: providing a bi-layer taper having an input port having a width W1 and a bi-layer taper output port having a width W2; providing a mode squeezer having an input port having a width W2 in optical communication with the bi-layer taper output port and a mode squeezer output port with a width W3, where W2 is larger than W3; providing an optical carrier having an input port in communication with the mode squeezer output port and having a transition region, the optical carrier configured to be lossy with regard to optical modes above the fundamental mode; and providing an output taper in optical communication with the transition region and having an output taper output port of width W1.

According to another aspect, the invention relates to a method of using a low loss high extinction ratio on-chip polarizer. The method comprises the steps of: providing a bi-layer taper having a bi-layer taper input port having a width W1 and a bi-layer taper output port having a width W2; providing a mode squeezer having an input port having a width W2 in optical communication with the bi-layer taper output port and a mode squeezer output port with a width W3, where W2 is larger than W3; providing an optical carrier having an input port in communication with the mode squeezer output port and having a transition region, the optical carrier configured to be lossy with regard to optical modes above the fundamental mode; providing an output taper in optical communication with the transition region and having an output taper output port of width W1; receiving at the bi-layer taper input port an optical signal having at least one of a TE mode with an input TE mode intensity and a TM mode with an input TM mode intensity; and observing at the output taper output port an optical signal having a TE0 mode intensity substantially equal to the input TE mode intensity and a TM mode intensity substantially diminished relative to the input TM mode intensity.

In one embodiment, the optical signal having at least one of a TE mode with an input TE mode intensity and a TM mode with an input TM mode intensity is an optical signal having a wavelength within the range of a selected one of an O-Band, an E-band, a C-band, an L-Band, an S-Band and a U-band.

In another embodiment, the method is used to reduce polarization crosstalk.

In yet another embodiment, the method is used to provide a high polarization extinction ratio.

The foregoing and other objects, aspects, features, and advantages of the invention will become more apparent from the following description and from the claims.

BRIEF DESCRIPTION OF THE DRAWINGS

The objects and features of the invention can be better understood with reference to the drawings described below.

DETAILED DESCRIPTION

Acronyms

Figure 1:
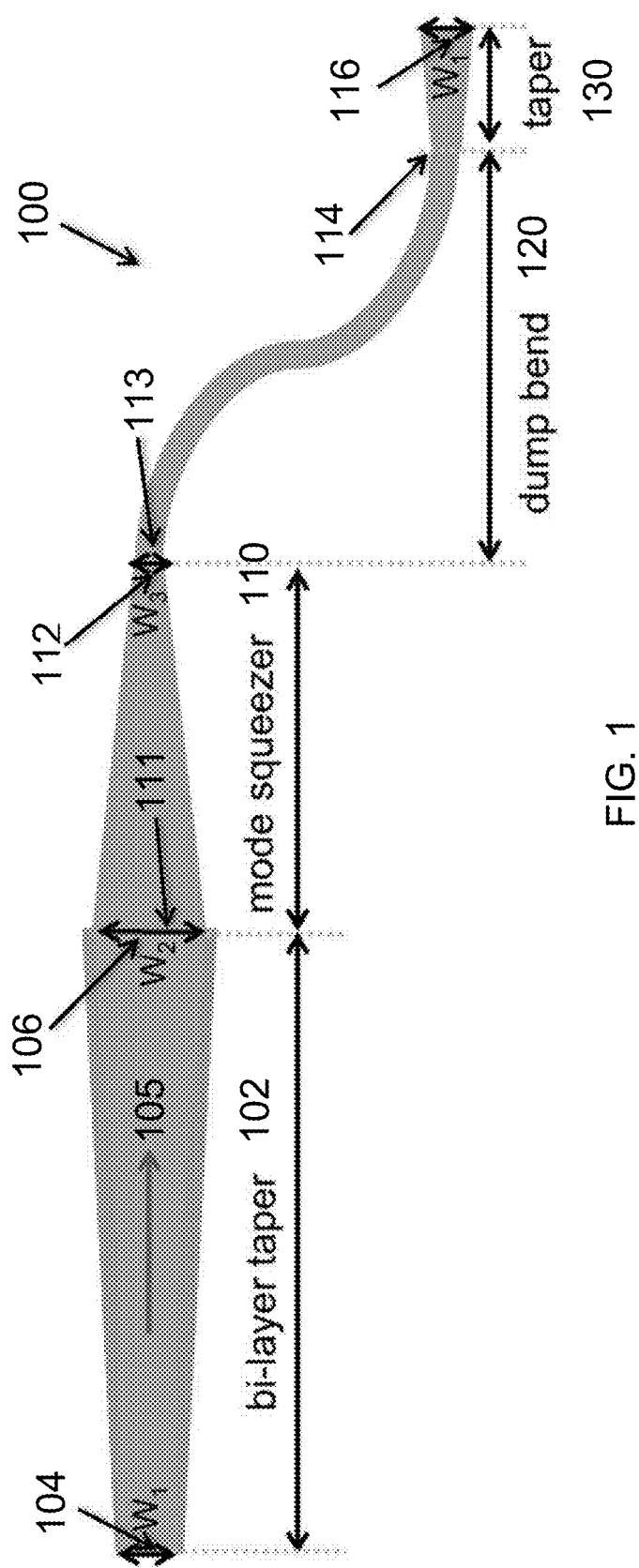
FIG. 1 is a schematic diagram of an embodiment of a mode throttle constructed according to principles of the invention.

A list of acronyms and their usual meanings in the present document (unless otherwise explicitly stated to denote a different thing) are presented below.

AMR Adabatic Micro-Ring
APD Avalanche Photodetector
ARM Anti-Reflection Microstructure
ASE Amplified Spontaneous Emission
BER Bit Error Rate
BOX Buried Oxide
CMOS Complementary Metal-Oxide-Semiconductor
CMP Chemical-Mechanical Planarization
DBR Distributed Bragg Reflector
DC (optics) Directional Coupler
DC (electronics) Direct Current
DCA Digital Communication Analyzer
DRC Design Rule Checking
DSP Digital Signal Processor
DUT Device Under Test
ECL External Cavity Laser
E/O Electro-optical
FDTD Finite Difference Time Domain
FFE Feed-Forward Equalization
FOM Figure of Merit
FSR Free Spectral Range
FWHM Full Width at Half Maximum
GaAs Gallium Arsenide
InP Indium Phosphide
LiNO$_3$ Lithium Niobate
LIV Light intensity(L)-Current(I)-Voltage(V)
MFD Mode Field Diameter
MPW Multi Project Wafer
NRZ Non-Return to Zero
OOK On-Off Keying
PIC Photonic Integrated Circuits
PRBS Pseudo Random Bit Sequence
PDFA Praseodymium-Doped-Fiber-Amplifier
PSO Particle Swarm Optimization
Q Quality factor $$Q = 2\pi \times \frac{\text{Energy Stored}}{\text{Energy dissipated per cycle}} = 2\pi f_r \times \frac{\text{Energy Stored}}{\text{Power Loss}}.$$

QD Quantum Dot
RSOA Reflective Semiconductor Optical Amplifier
SOI Silicon on Insulator
SEM Scanning Electron Microscope
SMSR Single-Mode Suppression Ratio
TEC Thermal Electric Cooler
WDM Wavelength Division Multiplexing A device that only passes the fundamental mode of an optical signal would be very desirable to increase optical signal qualities. Such as device is referred to herein as a mode throttler, or as an integrated polarizer, or as a low loss high extinction ratio on-chip polarizer.

A mode throttler is advantageous to eliminate intermediate state high order mode noise signals that can be generated as an optical signal passes through a conventional PIC. A mode throttler is advantageously employed to decrease polarization crosstalk and increase signal to noise ratio.

We describe a mode throttler with ultra-low loss (<0.05 dB) and high polarization extinction ratio (ER) (>20 dB) as a solution to the problem of eliminating the unwanted TM0 mode while avoiding a loss to the TE mode. The present approach converts the unwanted mode (TM0 mode in the demonstration offered) into a higher order mode or modes and then throwing off the higher order mode(s). This is different from the prior art mode throttler (or integrated polarizers) that focused on dealing with the lowest order modes directly. At the same time, the fundamental mode (TE0 mode in demonstration offered) needs to be preserved across the mode throttler. In one embodiment of the a low loss high extinction ratio on-chip polarizer, a TM0 mode introduced at an input port is converted to a TE1 mode which is force to leak out of a leaky bent optical carrier, while a TE0 mode is preserved and is delivered with minimal loss at an output port.

FIG. 1 is a schematic diagram 100 of an embodiment of a mode throttler constructed according to principles of the invention. As shown in FIG. 1, a bi-layer taper 102 has an input port 104 having a width W1 and an output port 106 having a width W2. Illumination, such as an optical signal to be process enters the bi-layer taper 102 and propagates in the direction indicated by arrow 105. A mode squeezer 110 has an input port 111 having a width W2 in optical communication with output port 106 and an output port 112 with a width W3, where W2 is larger than W3. The mode squeezer 110 receives illumination from the bi-layer taper 102. An optical carrier 120, such as an S-bend (or dump bend) receives illumination from the mode squeezer 110 at an input port 113 and carries illumination to a transition region 114 where the illumination enters a taper 130 having an output port 116 of width W1.

The bi-layer taper 102 functions as mode convertor that converts a TM0 mode into a TE1 mode but preserves a TE0 mode. Then a single layer taper 110 follows to quickly narrow down the waveguide to squeeze the TE1 mode out of the waveguide. This part is thus indicated as mode squeezer 110. In the S-bend 120 the TE1 mode is deliberately lost (e.g., dumped) because the S-bend is a narrow and leaky waveguide for higher modes but the TE0 mode is preserved. Finally the waveguide is tapered back to the width W1 of the input port 104, and an optical signal having substantially only the TE0 mode is delivered as output.

The design only requires two silicon layers and has no small critical dimension sizes. Therefore, it can be readily fabricated in a CMOS process, for example using a silicon on insulator wafer.

In one embodiment, the waveguide that comprises the low loss high extinction ratio on-chip polarizer can be fabricated as a 500 nm wide, 220 nm thick silicon waveguide, in which TE0 is the fundamental mode. One can make such waveguides using silicon on insulator wafers.

Figure 2A:
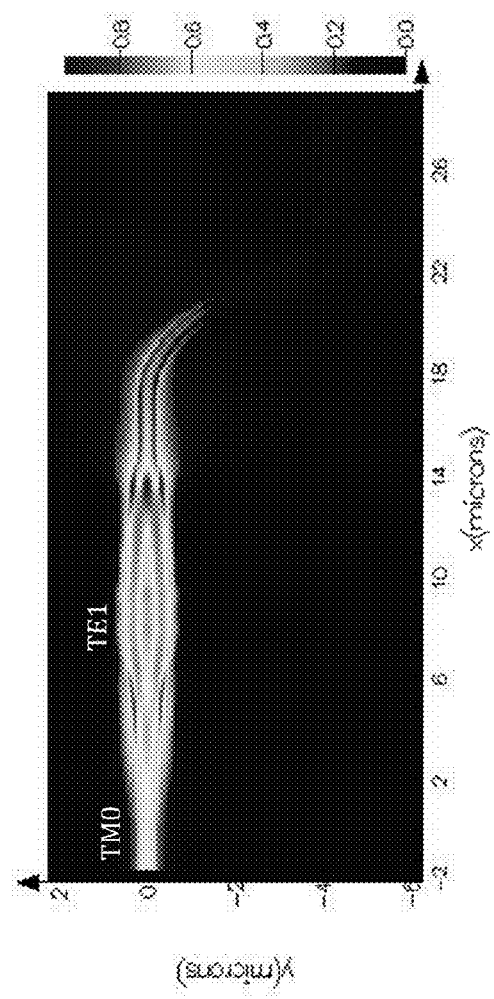
FIG. 2A is a contour plot showing the magnitude of the E-field transition at the TM0 input.

FIG. 2A is a contour plot showing the magnitude of the E-field transition at the TM0 input.

Figure 2B:
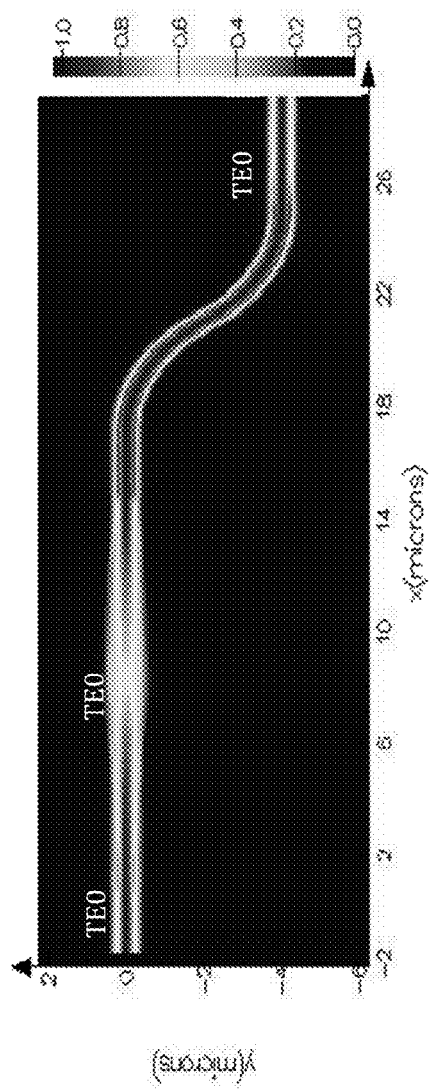
FIG. 2B is a contour plot showing the magnitude of the E-field transition at the TE0 input.

FIG. 2B is a contour plot showing the magnitude of the E-field transition at the TE0 input.

As is clearly seen in FIG. 2A and FIG. 2B, a TM0 mode is converted into a TE1 mode. The TE1 mode is scattered at the mode squeezer and almost completely eliminated after the S-bend. However, the TE0 mode size expands or shrinks depending on different widths, but the optical power is preserved. No scattering loss can be observed. For the embodiment described, the parameters are W1=0.5 μm, W2=1.25 μm, W3=0.4 μm, and R_s_bend=5 μm.

Figure 3B:
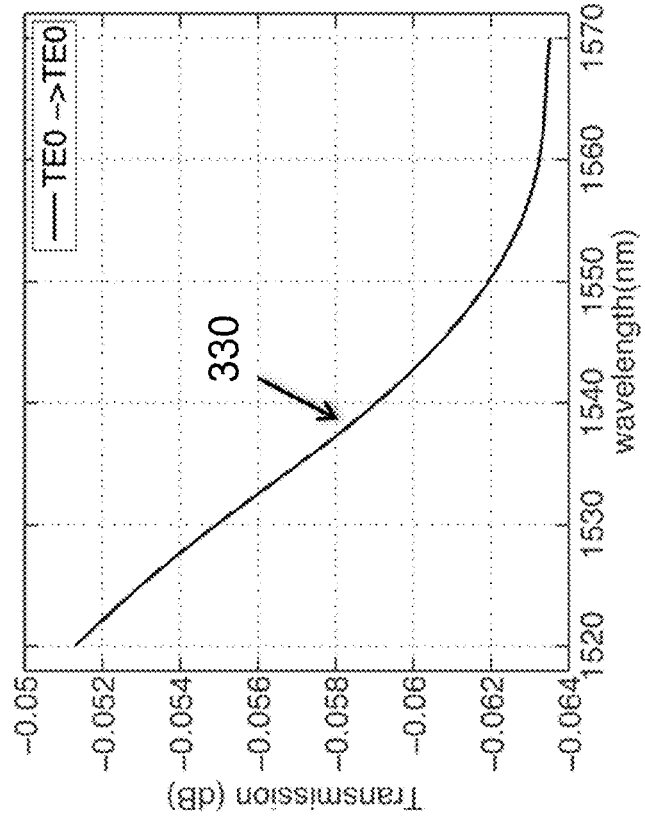
FIG. 3B is a graph that illustrates the wavelength response of the TE0 loss.
Figure 3A:
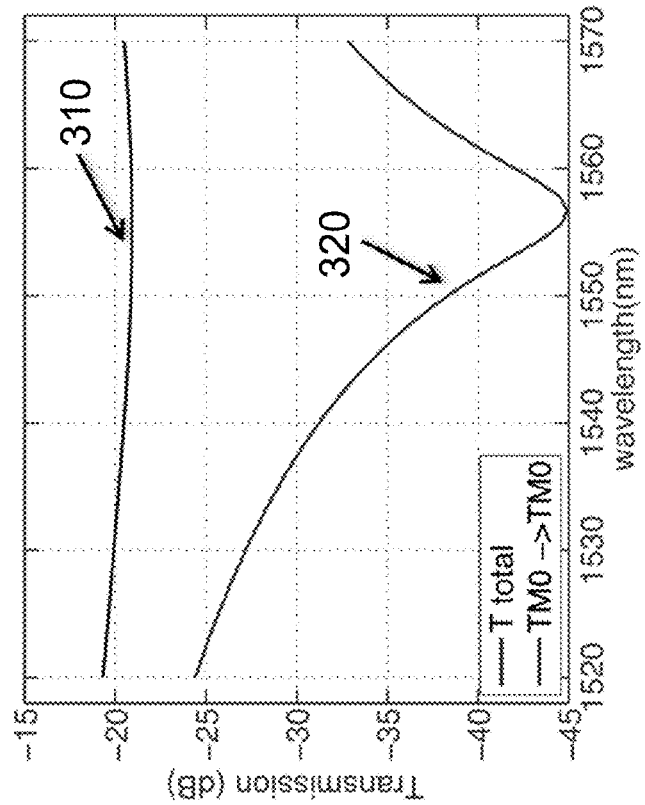
FIG. 3A is a graph that illustrates the wavelength response of the extinction ratio.

FIG. 3A is a graph that illustrates the wavelength response of the extinction ratio.

FIG. 3B is a graph that illustrates the wavelength response of the TE0 loss.

The curve 310 in FIG. 3A shows the total preserved power, T_total, at TM0 input. T_total is about −20 dB across the C-band. The curve 320 in FIG. 3A shows that the preserved TM0 component is considerably smaller, <−25 dB. It is believed that the TM0 loss can be tuned as a function of wavelength. The curve 330 in FIG. 3B shows the loss for TE0 mode which is quite low, <0.06 dB. Therefore the final polarization extinction ratio is about 20 dB, defined by the difference of TE0 loss at TE0 input and T_total at TM0 input.

In summary, the mode throttler has ultralow loss (0.06 dB) for a TE0 mode, a high extinction ratio (20 dB) for a TM0 mode, and is compatible with a CMOS fabrication process.

It is believed that apparatus constructed using principles of the invention and methods that operate according to principles of the invention can be used in the wavelength ranges described in Table I.

TABLE I

| Band | Description | Wavelength Range |
| --- | --- | --- |
| O band | original | 1260 to 1360 nm |
| E band | extended | 1360 to 1460 nm |
| S band | short wavelengths | 1460 to 1530 nm |
| C band | conventional ("erbium window") | 1530 to 1565 nm |
| L band | long wavelengths | 1565 to 1625 nm |
| U band | ultralong wavelengths | 1625 to 1675 nm |

Design and Fabrication

Methods of designing and fabricating devices having elements similar to those described herein are described in one or more of U.S. Pat. Nos. 7,200,308, 7,339,724, 7,424,192, 7,480,434, 7,643,714, 7,760,970, 7,894,696, 8,031,985, 8,067,724, 8,098,965, 8,203,115, 8,237,102, 8,258,476, 8,270,778, 8,280,211, 8,311,374, 8,340,486, 8,380,016, 8,390,922, 8,798,406, and 8,818,141, each of which documents is hereby incorporated by reference herein in its entirety.

DEFINITIONS

As used herein, the term "optical communication channel" is intended to denote a single optical channel, such as light that can carry information using a specific carrier wavelength in a wavelength division multiplexed (WDM) system.

As used herein, the term "optical carrier" is intended to denote a medium or a structure through which any number of optical signals including WDM signals can propagate, which by way of example can include gases such as air, a void such as a vacuum or extraterrestrial space, and structures such as optical fibers and optical waveguides.

Theoretical Discussion

Although the theoretical description given herein is thought to be correct, the operation of the devices described and claimed herein does not depend upon the accuracy or validity of the theoretical description. That is, later theoretical developments that may explain the observed results on a basis different from the theory presented herein will not detract from the inventions described herein.

Any patent, patent application, patent application publication, journal article, book, published paper, or other publicly available material identified in the specification is hereby incorporated by reference herein in its entirety. Any material, or portion thereof, that is said to be incorporated by reference herein, but which conflicts with existing definitions, statements, or other disclosure material explicitly set forth herein is only incorporated to the extent that no conflict arises between that incorporated material and the present disclosure material. In the event of a conflict, the conflict is to be resolved in favor of the present disclosure as the preferred disclosure.

While the present invention has been particularly shown and described with reference to the preferred mode as illustrated in the drawing, it will be understood by one skilled in the art that various changes in detail may be affected therein without departing from the spirit and scope of the invention as defined by the claims.

What is claimed is:

1. A low loss high extinction ratio on-chip polarizer, comprising:
   a bi-layer taper having an input port having a width W1 and a bi-layer taper output port having a width W2, wherein W1 is smaller than W2;
   a mode squeezer having an input port having a width W2 in optical communication with said bi-layer taper output port and a mode squeezer output port with a width W3, where W2 is larger than W3;
   an optical carrier having an input port in communication with said mode squeezer output port and having a transition region, said optical carrier configured to be lossy with regard to optical modes above the fundamental mode; and
   an output taper in optical communication with said transition region and having an output taper output port of width W1.

2. The low loss high extinction ratio on-chip polarizer of claim 1, wherein said optical carrier is an S bend.

3. The low loss high extinction ratio on-chip polarizer of claim 1, wherein at least one of said bi-layer taper, said mode squeezer, said optical carrier and said output taper is disposed on a semiconductor wafer.

4. The low loss high extinction ratio on-chip polarizer of claim 3, wherein said semiconductor wafer is a silicon on insulator wafer.

5. The low loss high extinction ratio on-chip polarizer of claim 1, wherein said bi-layer taper is configured to convert a TM0 mode into a TE1 mode but preserve a TE0 mode.

6. The low loss high extinction ratio on-chip polarizer of claim 1, wherein said mode squeezer is configured to narrow down a waveguide to squeeze a TE1 mode out of said waveguide.

7. The low loss high extinction ratio on-chip polarizer of claim 1, wherein said optical carrier is configured as a narrow and leaky waveguide for higher modes and is configured to preserve a TE0 mode.

8. The low loss high extinction ratio on-chip polarizer of claim 1, configured to operate at a wavelength within the range of a selected one of an O-Band, an E-band, a C-band, an L-Band, an S-Band and a U-band.

9. A method of making a low loss high extinction ratio on-chip polarizer, comprising the steps of:
providing a bi-layer taper having an input port having a width W1 and a bi-layer taper output port having a width W2, wherein W1 is smaller than W2;
providing a mode squeezer having an input port having a width W2 in optical communication with said bi-layer taper output port and a mode squeezer output port with a width W3, where W2 is larger than W3;
providing an optical carrier having an input port in communication with said mode squeezer output port and having a transition region, said optical carrier configured to be lossy with regard to optical modes above the fundamental mode; and
providing an output taper in optical communication with said transition region and having an output taper output port of width W1.

10. A method of using a low loss high extinction ratio on-chip polarizer, comprising the steps of:
providing a bi-layer taper having a bi-layer taper input port having a width W1 and a bi-layer taper output port having a width W2, wherein W1 is smaller than W2;
providing a mode squeezer having an input port having a width W2 in optical communication with said bi-layer taper output port and a mode squeezer output port with a width W3, where W2 is larger than W3;
providing an optical carrier having an input port in communication with said mode squeezer output port and having a transition region, said optical carrier configured to be lossy with regard to optical modes above the fundamental mode;
providing an output taper in optical communication with said transition region and having an output taper output port of width W1;
receiving at said bi-layer taper input port an optical signal comprising at least one of a TE mode with an input TE mode intensity and a TM mode with an input TM mode intensity; and
observing, at said output taper output port an optical signal having a TE0 mode intensity substantially equal to said input TE mode intensity and a TM mode intensity substantially diminished relative to said input TM mode intensity.

11. The method of using a low loss high extinction ratio on-chip polarizer of claim 10, wherein said optical signal comprises an optical signal having a wavelength within the range of a selected one of an O-Band, an E-band, a C-band, an L-Band, an S-Band and a U-band.

12. The method of using a low loss high extinction ratio on-chip polarizer of claim 10 to reduce polarization crosstalk.

13. The method of using a low loss high extinction ratio on-chip polarizer of claim 10 to provide a high polarization extinction ratio.

* * * * *